United States Patent
Arthanarisamy et al.

(10) Patent No.: US 10,579,619 B2
(45) Date of Patent: Mar. 3, 2020

(54) VALIDATION OF QUERY PLAN

(71) Applicant: International Business Machines Corporation, Armonk, NY (US)

(72) Inventors: Krishnamurthy Arthanarisamy, Bangalore (IN); Tapas Saha, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 384 days.

(21) Appl. No.: 15/422,910

(22) Filed: Feb. 2, 2017

(65) Prior Publication Data

US 2018/0218041 A1 Aug. 2, 2018

(51) Int. Cl.
*G06F 17/30* (2006.01)
*G06F 16/2453* (2019.01)

(52) U.S. Cl.
CPC .................. *G06F 16/24542* (2019.01)

(58) Field of Classification Search
CPC .................................................. G06F 16/24542
See application file for complete search history.

(56) References Cited

U.S. PATENT DOCUMENTS

| | | | |
|---|---|---|---|
| 8,417,690 B2 | 4/2013 | Poppe et al. | |
| 9,031,932 B2* | 5/2015 | Idicula | G06F 16/283 707/714 |
| 9,317,711 B2 | 4/2016 | Klein et al. | |
| 2011/0313999 A1* | 12/2011 | Bruno | G06F 16/24537 707/718 |
| 2016/0171236 A1 | 6/2016 | Konik et al. | |

* cited by examiner

*Primary Examiner* — Tuankhanh D Phan
(74) *Attorney, Agent, or Firm* — North Shore Patents, P.C.; Michele Liu Baillie (57) ABSTRACT

Database query optimization method that provides for selective restriction of an operation. A query plan for a query is received. The query plan includes an operation to be executed on a table. The received query plan is traversed to determine at least one table in the query plan having a mapping with a threshold rule and based upon a determination that there is at least one table in the query plan having a mapping with the threshold rule, substituting the operation on the at least one table identified in the query plan to another operation having the mapping with the threshold rule.

18 Claims, 4 Drawing Sheets

VALIDATION OF QUERY PLAN

BACKGROUND

The present invention generally relates to query plan and more particularly towards validating query plan for optimal usage of resources.

A database is an ordered collection of data, where data is logically stored as a series of rows and columns in one or more tables. To access one or more rows or columns of data from the tables, query to the database is made using one or more query statements. The query statement declares amount of data to be retrieved and represented. In one example, the query statement can mention description such as identity of fields, a join between different fields, the database to return the values for the identified fields, rows in order to be generated as a result (product). Before the query is run, the query plan is generated. The query plan determines the sequence of functions (operations) to be performed on those tables and relations between the identified tables, in the database to achieve the desired results.

At times, if a poorly written query is allowed to run, based on the generated query plan, it may cause overall performance of the database to suffer. The query plan could have failed to achieve the desired result, because it may not have dealt with all the different types of work being executed within the database server. Also, the query may have been a badly written query, as a result of common typing omissions, and thus lead to an end result which is not the desired result. Therefore, to make certain the end result has accuracy, consistency and reliability of the data from the database, the query plans which are generated need to be analyzed to ensure desired query results.

SUMMARY

Disclosed herein is a method for selective restriction of an operation and a computer program product as specified in the independent claims. Embodiments of the present invention are given in the dependent claims. Embodiments of the present invention can be freely combined with each other if they are not mutually exclusive.

There is need for a system which can prevent execution of a badly written query and can achieve a stable execution environment. To overcome the above deficiencies, of the badly written query, there is need for a system that operates as a validation process, and check whether the generated query plan, if allowed to run, could result in an unending running of the query.

There is required a system which based upon identifying a badly written query, can prevent perpetual running of the query and thus, reduce performance issues. A system that allows for including mechanisms to prevent the database from becoming unresponsive and thus, result in a database crash.

Additional features of the invention will be set forth in the description which follows, and in part, will be apparent from the description, or may be learned by practice of the invention. A computer-implemented method for selective restriction of an operation, is described. The method comprising: receiving a query plan for a query, the query plan including an operation to be executed on a table; traversing the received query plan to determine at least one table in the query plan having a mapping with a threshold rule; and based upon a determination that there is at least one table in the query plan having a mapping with the threshold rule, substituting the operation on the at least one table identified in the query plan to another operation having the mapping with the threshold rule.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. The various features of the drawings are illustrations for clarity and not to scale.

DETAILED DESCRIPTION

Terms such as query plan, access plan, execution plan, may be used interchangeably. Likewise, terms such as a result set or query result may be used interchangeably.

Before a query is run on a database, user defined parameters, are collected to define the query. A database engine such as an optimizer generates a query (access) plan corresponding to the user defined parameters of the query, based on availability of resources. The query plan is an execution plan, that identifies various tables which are involved in a given query operation. The generated query plan provides details as to series of functions to be executed and the tables on which such functions shall be executed. Preferably, the query plan which is to run on the database, is generated with an intent to minimize cost while maintaining optimal usage of the available resources.

When it is found that execution of the query as per the query plan, can lead to unresponsive behavior of the database or database crash, there is need to identify the cause of an unconstrained query forthright, because running of such a query can impose a significant load on the available resources and take a longer execution time and further producing inaccurate and misleading results.

Some examples when the queries can lead to no end are those which involve complete table scans or result in Cartesian joins between the tables, for example large data warehouse tables. When a query is determined to have Cartesian join or table scan such that the query is directed to bring a desired result which could reduce time, processing load on the server and minimize the number of query results and prevent inaccurate results.

Embodiments of the present invention are configured to determine whether execution of the query according to the query plan would result in either one of the Cartesian join or the table scan of the product.

A Cartesian join is the join in which all the rows of one table are mapped to every row of the other table without any join condition specified. The Cartesian product results from failure to provide a filter on the join. Further, since such a Cartesian join requires joining of all rows, it takes a long time for the execution cycle to complete. This joining is very resource intensive. Likewise, table scan is a database operation where every row in a table is read as part of query processing. The amount of resources (e.g., CPU, power, memory, I/O resources etc.) and time spent in retrieving, appending information in one table can be prohibitive. Some results can be inaccurate and misleading, as the user may not have intended Cartesian join or table scans. If the solution is provided that can upfront identify tables having Cartesian join and thus, establish imposing the rules on the identified tables, leading to leveraging referential constraints, can ensure reduction of the processing load on the machine executing the query.

A method is proposed that determines whether the query results in one of the Cartesian join or the table scans should be allowed to be executed or avoided or routed to another process, such that Cartesian join or table scans restraints between the tables is eliminated.

Some preferable embodiments of the present invention will now be described in more detail with a reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art. Embodiments of the present invention will now be described in detail with reference to FIGS. 1-4.

Figure 1:
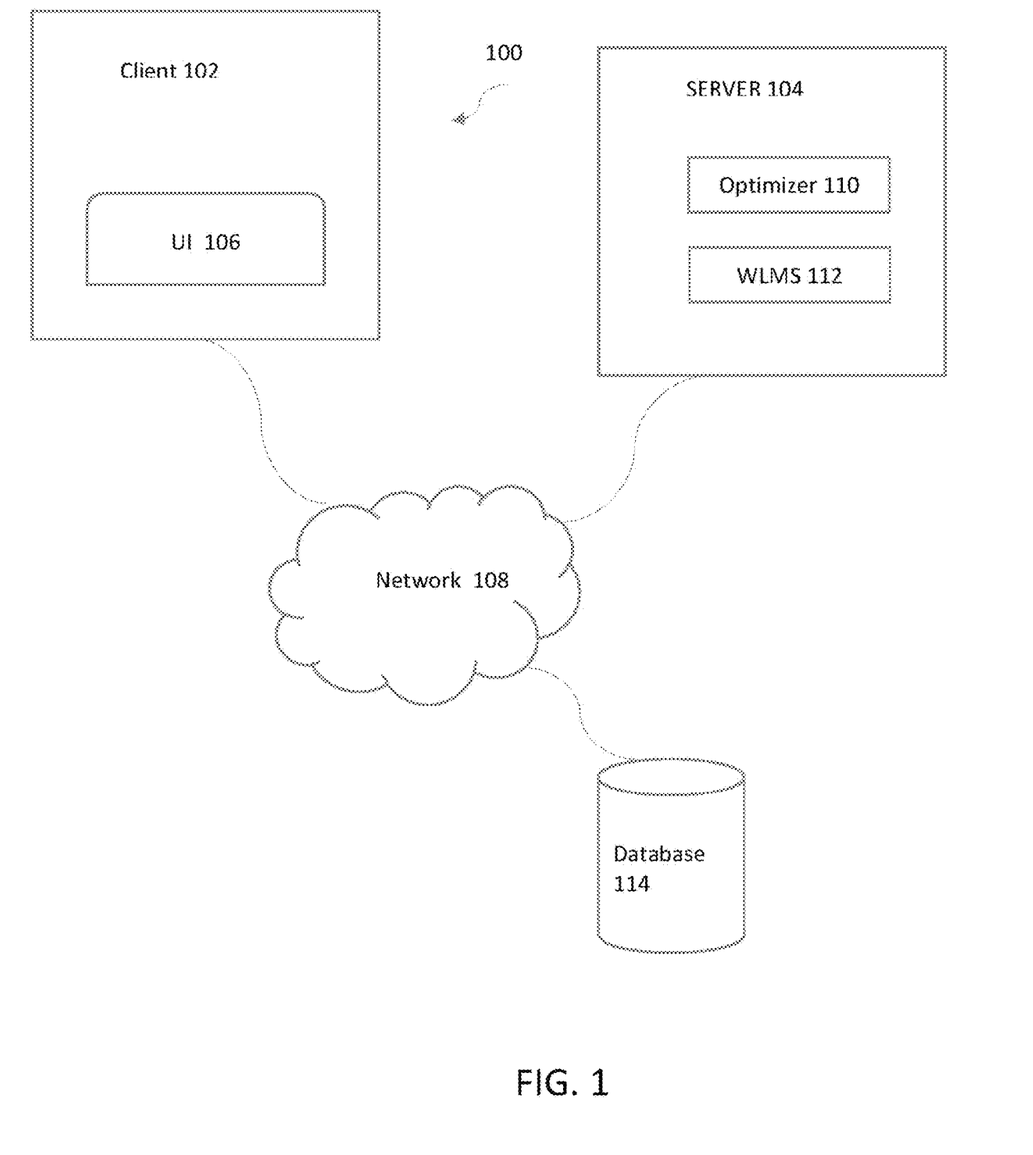
FIG. 1 illustrates an exemplary schematic structural diagram of an environment for running queries on the database, according to one embodiment.

FIG. 1 is an example representation of a functional block diagram of a system illustrating a method for running a query, in accordance with one embodiment of the present environment. The environment 100 includes a server 104, a client 102, and a database 114 connected with a network 108.

FIG. 1 illustrates a client 102, a device to enable a user to send a request to the server 104. In one example, the request may be an input to execute the query and generate a result set by running the query on the database. In another example, the request may be to generate a query plan corresponding to the query. In one embodiment, the client 102 includes a user interface (UI) 106 which operates to receive a user input from the user. In one embodiment, the UI 106 provides an interface that enables the user of the client 102 to interact with the server 104 via the network 108.

In some embodiments, the client 102 may include a client application (not shown) to communicate with the server 104. In other embodiments, the client application intermediates through the server 104 to communicate with a database 114. In yet other embodiments, the UI 106 may be a part of the client application. The client application may be configured to receive output from either of the server 104 or the database 114, using display capabilities of the client 102 and/or client application. The output may be communicated in a variety of formats such as HTML, CSS and or JavaScript, or a variety of user interface technologies.

In various embodiments, the client 102 can be a laptop computer, a tablet computer, a netbook computer, a personal computer (PC), a desktop computer, a personal digital assistant (PDA), a smart phone, or any programmable electronic device capable of communicating with the server 104 and/or the database 114 via network 108. The client 102 may include internal and external hardware components, as depicted and described in further detail with respect to FIG. 4.

The request from the client 102 is received and processed by the server 104. In one embodiment, the server 104 is an example of database management system (DBMS). In various embodiments, the server 104 is a device that can be a standalone device, a server, a laptop computer, a tablet computer, a netbook computer, a personal computer (PC), or a desktop computer. In another embodiment, the server 104 represents a computing system configured to utilize clustered computers and components, such that they act as a single pool of seamless resources. In general, the server 104 can be any computing device or a combination of devices with access to the client 102 and with access to and/or capable of communicatively linked together over other devices through the network 108 (e.g., the Internet). In one example, the server 104 may perform as an Application programming interface (API). The server 104 may include internal and external hardware components, as depicted and described in further detail with respect to FIG. 4.

In one example, the server 104 may be configured to allow processing and execution of the queries on the database 114. The server 104 is capable of fetching information which may require access to several databases saved at different locations (not shown). The server 104 upon receiving the query may perform various operations such as add, delete, update and retrieve data on the database 114. In some exemplary embodiments, the server 104 may in order to execute the request from client 102 is configured to generate the query result from the scratch. In some exemplary embodiments, the server 104 may be configured to communicate with the database 114 and fetch the desired information as required, and then generate the query result. The server 104 may be further configured to save the result set corresponding to the data picked from the database 114 and display it on the client 102. The server 104 may perform maintenance operations on the database 114.

The server 104 may include other components such as an optimizer 110 and a workload management system (WLMS) 112, with which it coordinates to get access to the database 114 and generate the result set for display on the client 102.

In one example, the optimizer 110 is a component within the server 104 configured to generate the query plan. In some embodiments, the optimizer 110 may be an application within the server 104, configured to analyze queries received from the server 104 and create an execution (access/query) plan for the query. In some exemplary embodiments, the optimizer 110 may be an independent tool configured to receive inputs directly the user of the client 102 and analyze any number of attributes of the query in order to determine whether the query is from a legitimate source or an ad hoc query from a command line interface.

In one example, the optimizer 110 may utilize any of the heuristic methods to arrive at the query plan. The optimizer 110 is generally configured to choose a query plan that is based on historical data. The optimizer 110 may utilize any number or combinations of the query and determine the number of rows that would be returned upon executing the query.

The optimizer 110 may be configured to determine whether a database table column includes many different values or very few unique values. The optimizer 110 builds the query plan based on the estimated number of resources required for running that query during normal processing. However, the query plan generated by the optimizer 110 does not deal with all the different types of work that execute within the server 104.

As indicated in FIG. 1, the server 104 further includes workload management layer (WLM) 112. WLM 112 may be a business intelligence tool that may contain programs which can perform one of the functions such as validation of the query plan. WLM 112 may be configured to determine consumption of resources being used on the server 104. WLM 112 may enable creation, alteration, drop, comment on, grant access to, and revoke access to the database 114, and for a user.

In one embodiment, WLM 112 can be an engine that performs the function of validating the generated query plan. In another embodiment, WLM 112 may be an application layer used to run the query as per the query plan on the fly by utilizing information related to other workloads/resources running on the database 114 and/or server 104. In one embodiment, the server 104 may be configured to receive the query plan from the optimizer 110 and communicate with a (WLM) 112 to validate the received query plan. In another example embodiment, the optimizer 110 may directly send the generated query plan to WLM 112 for validation. In some examples, WLM 112, may be configured to provide infrastructure to prioritize work, allocate resources (like allocating CPU cycles), define rules and corresponding actions that needs to be taken on the work that violates the threshold rules. WLM 112 may be configured to analyze whether the query is an overly broad query that attempts to extract undesired data or includes specific information limiting the breadth of the results to be returned by executing the query.

WLM 112 may be configured to gather activity information that gets executed for every table within the database 114. WLM 112 may be configured to monitor workload activities based on a historical record, and provide important information on overall response time patterns for the execution of the query. WLM 112 may be configured to separate and isolate competing workloads and determine individual response times for the workloads based on the resources available to different workloads.

WLM may be configured to determine threshold rules for each of the tables in the database based on the historical activity corresponding to each of the tables in the database 114. WLM 112 may be configured to provide in-depth analysis of the individual activities that are captured, in order to understand the flow and type of query statements submitted by a new query request.

WLM 112 may be configured to establish why a connection is not being mapped to the expected workload, by gathering information from the database pertaining to the identified tables. WLM 112 may be configured to determine which workload is being mapped to which resources. WLM 112 may be also configured to determine the sequence in which the workload would be executed.

WLM 112 can determine whether execution of the query results in one of a Cartesian join or a table scan between the tables and whether it can be allowed to be executed. WLM 112 is configured to read through the threshold rules cited in the table information. WLM 112 is configured to access through the identified tables in the database 114 to determine whether, there are any threshold rules preexisting for the identified tables. WLM 112 can establish whether the query should be executed as the query plan or needs to be performed as per the threshold rules corresponding to the identified tables from the database 114. WLM 112 is configured to monitor and modify several of the threshold rules/conditions added to the table information, based on the table activity. In some examples, the WLM 112 may base the analysis on the index/id of the tables involved. WLM 112 may be configured to manipulate the table information in the database 114.

WLM 112 may be configured to restrict queries based on a user name. It may only allow execution of the query plan corresponding to only the user that has an authority to access the database and to raise the query. In some exemplary embodiments, WLM 112 may require an administrator's approval before enabling execution of the query or request a special one-time password set by the administrator before executing the query. If WLM 112 restricts execution of the query, it may optionally return an error or simply not return a data.

As can be seen from FIG. 1, the database 114 is a storage, that may be an application configured to allow for the definition, creation, querying, updating and administration of the records. Database 114 saves for each of the records additional identification information corresponding to each of the rows, besides tables ids or column ids.

The database 114 may save additional information including the metadata dictionary on data lineage, integrity and history of the records. In some examples, metadata dictionary is a record that maintains information about data versions of each of the records associated with the database 114. The database 114 may store objects such as base tables, views, indexes etc. The database 114 may capture all data, settings, operating systems information etc. Database may also include one or more threshold rules which define operations/functions that can be allowed to be executed on specific tables. The database 114, may store information pertaining to threshold rules in a rulebook (not shown). The database 114 may save the threshold rules for the tables based on table name, for example database schema or table space. The database 114 may maintain structured relation between database tables, database records and metadata dictionary for easy access of the data and for enabling execution of the operations on the database based on the threshold rules.

While in FIG. 1, the database 114 is indicated as a single unit, it may be combination of several databases combined with one another (not shown). In some embodiments, the database 114 may store information pertaining to data records as discreet units at more than one location, for example, some information may be saved locally and other information may have public access. In the database 114, in one example, information may be saved in different sections. The database 114 can either have private or public access.

In some embodiments, the data in the database 114 can be read by one or more of the servers 110 and the client 102. In some embodiments, information about data saved in the database 114 can be read by programs and entities inside and/or outside of the environment 100 in order to populate the database 114 with new data. In one example, the database 114 is a hybrid database.

In some embodiments, the database 114 may be stored on disk storage or in one or more accessible memory locations. When speed is a key performance metric, the database 114 may have some portions stored in memory, while other portions of the data may be stored on disk storage. In one example, the database 114 may be part of the server 104 or may be located on cloud. The database 114 may store physical data in one or more different formats.

The database 114 may be visible to the user of the client device 102. Plurality of clients may interact with the database 114 via UI 106 or through a database interface (not shown). While no interface is shown separately for the given database, such an interface may be application that directly queries database 114. The database 114 may interact with application programming interfaces (APIs not pictured) or command line interfaces and the like. The database 114 interface may also be used to supply values that are used to form queries. Client 102 may interact directly with the database 114 and a user may be prompted to provide their user ID number in a text box.

Network 108 can be, a local area network (LAN), a wide area network (WAN) such as the Internet, or a combination of the two, and may include wired, wireless, fiber optic or any other connection known in the art. In general, the network 108 can be any combination of connections and protocols that will support communications between the server 104, the client 102, and the database 114, in accordance with an exemplary embodiment of the present invention.

Figure 2:
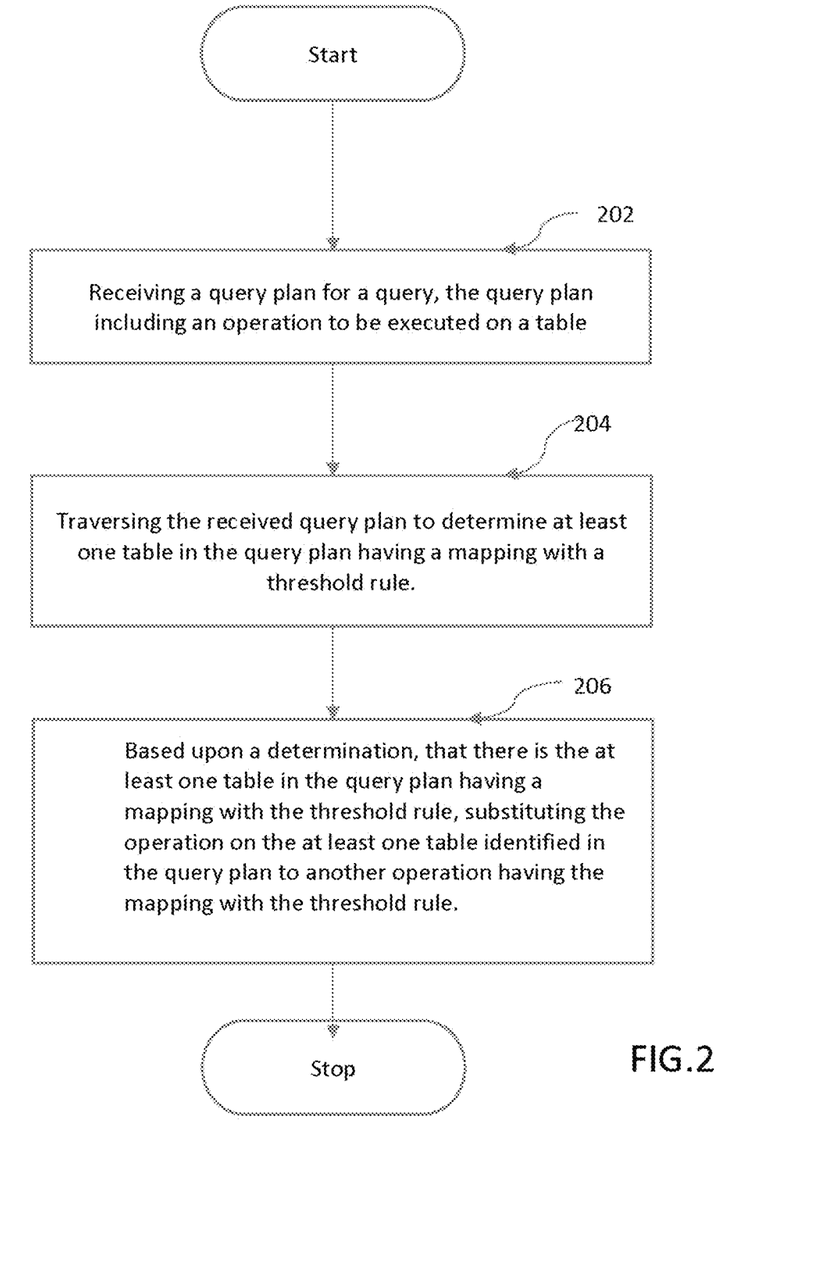
FIG. 2 illustrates an exemplary schematic flowchart depicting steps for selective restriction of an operation in case of identifying badly written query and providing a solution, according to one embodiment.

FIG. 2 is a flowchart depicting validation of query plan prior to execution of the query, on the server 104 within the environment 100 of FIG. 1, in accordance with an embodiment of the present invention. In an exemplary embodiment, the method provides for identifying badly written queries which could be resource intensive and make database performance unacceptably slower. In one example, WLM 112 may perform the validation process for the generated query plan, by traversing through the generated query plan and also the database 114 to ensure that the end result is the desired result set.

WLM 112 may be configured to analyze whether the execution of the query as per the generated query plan could result in one of either the Cartesian join and/or the table scan and whether it needs to be prevented. WLM 112 may look into query plan to check whether the automatically chosen join predicates are not the intended ones.

The method may follow the following steps. At step 202: a query plan for a query is received. The query plan includes an operation to be executed on a table. At step 204: the received query plan is traversed to determine at least one table in the query plan having a mapping with a threshold rule. At step 206, based upon a determination that there is at least one table in the query plan having a mapping with the threshold rule, substituting the operation on the at least one table identified in the query plan to another operation having the mapping with the threshold rule.

At step 202: a query plan for a query is received. The query plan includes an operation to be executed on a table. The query statements can be for adding, deleting and updating data, storing the retrieved data etc. In one example embodiment, through the UI 106, the query input is received. Syntax of the query statement forms the basis on which the query plan is generated. Running of the query as per the query plan gets the result set. The syntax includes information on number of data type parameters, keywords etc. to be used to generate the query result. The query statements can include reference to the databases, tables, and columns etc.

The query plan provides a most efficient way to execute the given query by considering all possible options. The query plan provides an optimal solution for executing the database query. The query plan indicates a number of data accesses between the node (tables) and the amount of data to be retrieved from the tables.

The query plan can indicate the relation between different nodes, for example, one to one or one to many relationships between two tables. In one example, the generated query plan may comprise a series of interconnected nodes, symbols, for selecting tables, rows from tables, table scans etc. Each node may represent a table in the database 114 that needs to be accessed. The nodes may be connected by one or more edges. The query plan indicates the manner in which the database query will be implemented in the database. The query plan is a mapping of the query statements to different functions.

In some cases, where, from the query plan, the identification of the tables cannot be explicitly established, WLM 112 may analyze information specific to the tables in the database 114 to determine, whether, the tables as identified in the query plan can be related. WLM 112 can also determine whether a referential constraint exists for identified tables in the database 114. WLM 112 may be further configured to determine whether there are any preexisting threshold rules defined for the identified tables, which either allow or prevent execution of the operation on combination of different tables.

At step 204: WLM 112 may traverse through the query plan to determine whether running the query could result in either one of the Cartesian join or the table scan on the identified tables. When a query plan is received, the present invention determines whether the query needs to be executed or restricted for the generated query plan. The received query plan is traversed to determine whether the execution of the query as per the query plan would provide the intended result set. It's a preliminary set up to validate the operations which will be executed on the database. This is done to verify the cases, where the automatically chosen join predicates are the intended ones or not, as in some situations the returned results may not be what a user expected. In one example, the validation process may be performed by WLM 112.

WLM 112 may span through the generated query plan to identify the tables that would associate one or more operations/functions on the identified tables from the query plan. WLM 112 is configured to determine current state for the identified tables in the query plan.

Based upon a determination that the query plan could result in one of either the Cartesian join or the table scan, WLM 112 is configured to establish identity of the such tables with the corresponding tables in the database 114. In one example, this implies determining the number of rows and columns in the associated tables and further determining whether such Cartesian joins or table scans are part of the badly written query.

WLM 112 may analyze the identified tables in the database 114 and determine whether the query maps particular tables in the schema of the database 114. WLM 112 can use the information of the identified tables in the query plan, to establish the relation with the corresponding unknown tables in the database 114. WLM 112 may determine whether the columns between the two tables, have any commonality, which can be used as identification parameter for tables. In one example, WLM 112 may be configured to traverse through generated query plan to identify at least one table in the query plan that has a mapping with a corresponding table from the database 114. WLM 112 may be configured to establish identify of the table names based on extracting table information, from the database 114, using one of a table name, table space or database schema.

WLM 112 may be configured to establish a mapping between the tables identified in the query plan with the comparable threshold rules of the database 114. WLM 112 may be further configured to associate operations/functions, which need to be executed on the correlative tables of the database 114 based on the threshold rules.

WLM 112 may be configured to fetch from the database 114, the table and the corresponding operation/function that can be executed on that table in the database 114. WLM 112 may be configured to prefetch priorities for the tables from the threshold rules identified in the database 114. This is done to determine whether the identified tables require the operation associated with the threshold rule to be performed.

WLM 112 may scan through an information section of the database (not shown). The information section is a data store that may hold configuration information of each of the tables. The information section may further hold plurality of different threshold rules for the tables. Such threshold rules may be leveraged by WLM 112 before validating the execution plan generated by the optimizer 110. Based upon the threshold rules, WLM 112 may route the execution either as per the query plan or as per the threshold rules.

In one example, threshold rules and/or information section is saved in a rule book of the database 114 (not shown). Threshold rules may be user defined rules or default rules. Threshold rules may further define/guide an operation/function to be performed on the table in the database 114. WLM 112 may be enabled to compute threshold rules defined for the tables, corresponding to which one or more operations may be allowed to be operated on one or more set of tables. In one embodiment, WLM 112 may be configured to create or modify threshold rules based on historical data and machine learnings. Some of the examples of the threshold rules can be, estimated number of rows returned by a query must be less than a threshold number (such as 10 rows), or a threshold percentage of the table size (such as 0.05% of the table data). Threshold rule may specify conditions for some of the tables separately or in combination.

Different threshold rules may be applicable for different queries. In one example, a low threshold rule may apply to the query received from a secure trusted location, while a higher threshold may apply to a query received from an unknown location. In some cases, the threshold rules may further specify predefined operations for identified set of tables. For example, for generation of data from certain identified tables, the threshold rules may require validation by the administrator.

In one embodiment, WLM 112 may analyze a number of selection predicates in the query such as a source of the query and access methods specified by the query, a number of rows to be returned by executing the query, to determine whether selection predicates are meaningfully limiting of the result set based on the threshold rules.

In one embodiment, wherein WLM 112 has analyzed that the identified table in the query plan could result in the Cartesian Join, WLM 112 is configured to identify a corresponding table in the database 114, based on a table name. This implies that WLM 112 would map the table name from the query plan with the corresponding table name in the database 114. Where WLM 112 couldn't trace the identity of the table based on the table name, WLM 112 may be configured to check whether identity could be established on one of a table space or a database schema. In this case, WLM 112 could determine the corresponding table information utilizing one of the table space or the database schema. WLM 112 is configured to extract the table name in the database 114, based on either the table space or the database schema.

Once the identity of the table in the database 114 is established either through one of either the table name, the database schema or the table space, WLM 112 is further configured to read through the rule (information) book having threshold rules to determine whether there are any corresponding Cartesian join rules applicable on the identified table name. Wherein WLM 112 could establish that there are corresponding Cartesian join rules applicable to the identified table, in the database 114, the WLM 112 may be configured to associate the Cartesian join rule from the rule book with the identified table. WLM 112 may be further configured to route the query plan as per the identified threshold rule and substitute the Cartesian join rule from the rule book of the database 114 into the query plan, replacing the operation/function identified in the query plan. Where WLM 112 couldn't establish a mapping of the table that has a mapping with the threshold rule in the database, based on the table name, database schema or table space, WLM 112 may be configured to enable the function/operation to run on the basis of the generated query plan.

In another example embodiment, where WLM 112 could establish that the query plan does not identify a table which could result in the Cartesian join, WLM 112 may be further configured to check whether there are any tables in the query plan which could result in the table scan. Once WLM 112 is enabled to conclude that the query plan could result in the table scan, WLM 112 would determine the table name in the query plan on which the table scan operation would get performed. WLM 112 may be further configured to check in the database 114, whether there are any applicable table scan rules that correspond to the table identified in the query plan. WLM 112 is configured to check the database 114 first on the table name, to establish a corresponding mapping in the database 114. If WLM 112 couldn't establish identity of the table based on the table name, WLM 112 is configured to check the table name based on either the table space or the database schema. If WLM 112 succeeds in establishing the identity based on the table space or the database schema, WLM 112 may be configured to check whether there are any table scan rules available in the rule book for the identified table. Wherein, WLM 112 could find the corresponding table scan rules on the identified table, WLM 112 may be configured to route the operation as per the rule book, rather than as per the query plan. WLM 112 is configured to substitute the corresponding function/operation in the query plan based on the corresponding table scan rule identified from the rule book.

Wherein, the table's identity could not be established even with the database schema or table space, WLM 112 is configured to determine whether table's identity is based on table size. In such a case, WLM 112 would calculate the table size for the table identified from the query plan and check whether this is greater than the threshold size for the identified table in the rule book. If the table size is determined to exceed the threshold size, then the data would be fetched as per the size mentioned in the rule book. In other words, the query is run as per the query plan. WLM 112 determines whether the query is seeking broad number of results by selecting all rows and/or all columns of the given table. In one embodiment, WLM 112 may not return the results as asked for per the query plan, rather WLM 112 may route the query plan to be executed as per the threshold rules defined for the corresponding identified tables in the database 114. WLM 112 may limit the generation of results as per the query plan.

Where the table identity of the table identified in the query plan, which is likely to result in the table scan, does not have corresponding threshold rule in the database, WLM 112 may be configured to enable the query to be executed as per the query plan.

At step 206: In one embodiment, the query is modified to correctly redefine the query, such that the resulting query plan does not have a Cartesian join. In some other cases, the rules associated with the identified tables in the database are traversed, and it is determined whether execution is imminent or whether there should be automatic redirection to another tables.

Where WLM 112 has determined that there exists a mapping of the table identified from the query plan with a corresponding table having a mapping with the threshold rule in the database 114, WLM 112 is further configured to determine the corresponding operation associated with the table having a mapping with the threshold rule in the database 114. In response to the determination that the threshold rule in the database 114 points to a different operation for the identified table of the query plan, the method establishes that the query plan needs to be restricted, and should execute the operation as per the threshold rule on the table as defined in the database 114. Once it is determined that the operation associated with the threshold rule needs to be performed, the method provides for substituting the operation originally determined as per the query plan. The method requires the query plan to be altered such that the operation associated the query plan is removed and the operation associated with threshold rules is received/added to the query plan.

Also, in some implementations, a user may be enabled to validate the execution as per the threshold rule corresponding to the identified table, which resulted in one of a Cartesian join or a table scan. In some implementations, the user may have an additional option to enable or disable operation to identify Cartesian join or a table scan. In some implementations, the user may be enabled to selectively enable or disable, the validation of the execution plan for different combination of tables. For example, WLM 112 may allow the execution of the plan even when it contains Cartesian joins or it may disable the execution of the plan when Cartesian joins are identified. When the query plan is executed, the result of the query plan can be viewed through the UI 106 of the client 102.

In one example, notification regarding change of operation may be displayed to the user for his validation. In another example, the notification can be sent through various other channels such as email, short service message etc.

The above embodiments and implementations may be combined together and cross-referenced, thereby resulting in more embodiments.

Figure 3:
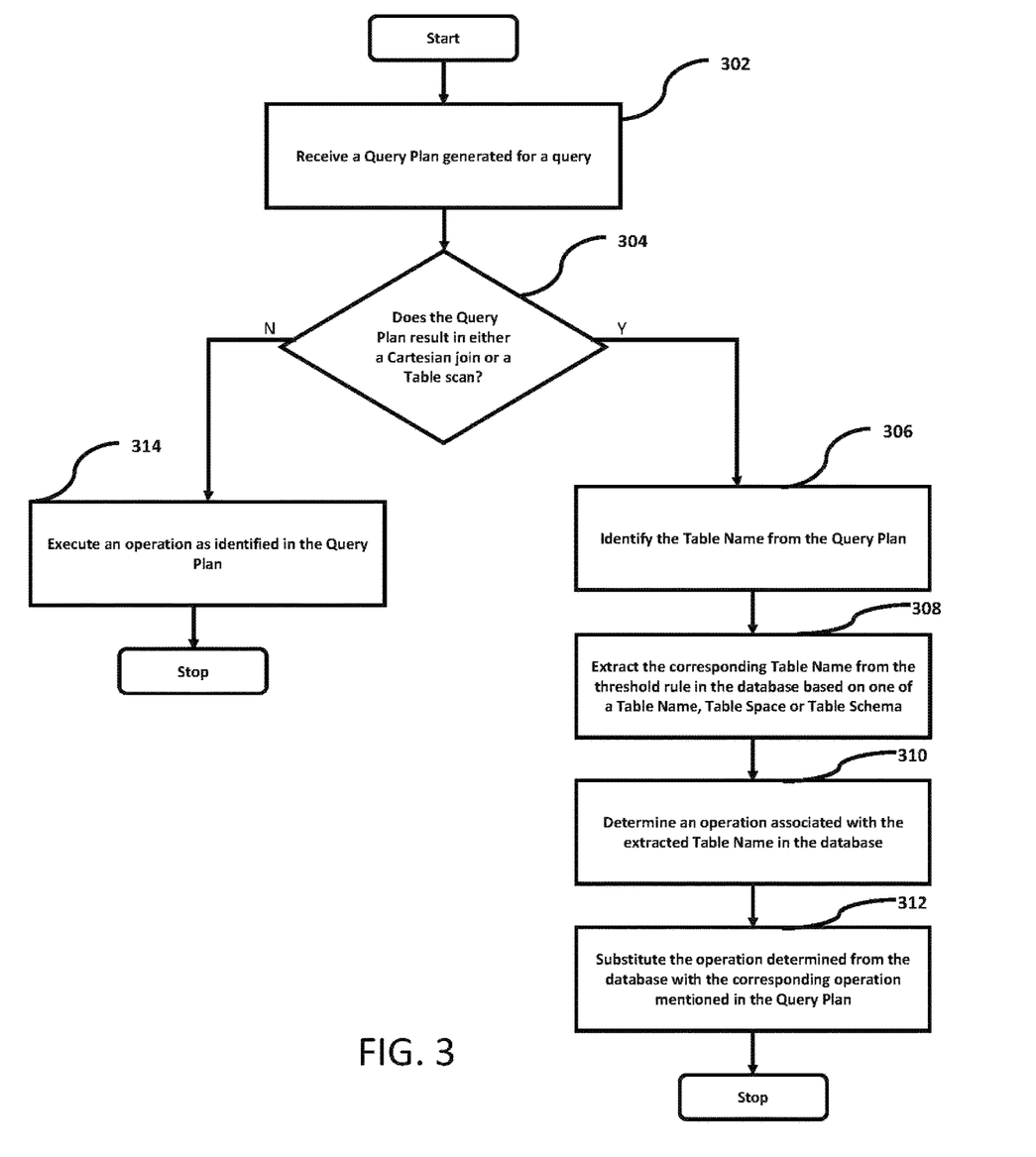
FIG. 3 illustrates an example process of lifecycle of identifying a badly written query, and generating a result set based on selective restriction of the operation in the query plan, according to one embodiment.

FIG. 3 is an example process of lifecycle of validating the query plan, according to one embodiment. WLM 112 may access table information each time a Cartesian join or table scan is identified to determine whether such Cartesian product join should be avoided. Method includes, upon determination that the received query plan would in all likelihood result in either one of the Cartesian join or the table scan, the process includes identifying the tables involved and map the identified table to a corresponding threshold rule information saved in the database. The method screens the threshold rule associated with the identified table in the database and enables the performance of a predefined operation as mentioned in the threshold rule to restrict an endless process, which could have resulted by allowing execution of the query as per the query plan. Stated differently, embodiments herein restrict databases from returning large amount of data to broad queries.

At step 302: A query plan is generated on the basis of inputs to the query. WLM 112 may dynamically traverse through each segment of the query plan and identify whether any of the segments/statements involve either one of a Cartesian join or table scan between a set of tables.

At step 304: The query plan is analyzed to determine whether query plan could identify any tables which would result in one of the Cartesian Join or the table scan. Where in it could be established that the query plan could result in all either the Cartesian join or the table scan, move to step 306 else move to step 314.

At step 306: Once it is established that the query plan includes at least one table which may return either the Cartesian join and the table scan, identify the table in the query plan is made out based on reading information associated with the respective identified table.

At step 308: When the identity of the table in the query plan is known, database is spanned to determine if there are any threshold rules in the database corresponding to the identified table. The table identity is done using one of a table name, database schema or a table space in the database 114. There can be either the Cartesian join or the table scan threshold rules. WLM 112 may further identify the threshold rules mentioned in the database corresponding to the identified tables.

At step 310: Once either of the Cartesian join or the table scan threshold rules are identified, as the case may be, there is further determination of the operation associated with the corresponding threshold rules.

At step 312: the method proceeds to substitute the operation based on the threshold rules in place of the operation contained in the query plan. WLM 112 may cause the operation leveraged through the threshold rules for the identified table, in the database, to be executed.

At step 314: Where it is determined that there is no table identified from the threshold rules having a mapping based on one of either the Cartesian join or the table scan rules, then the operation as decided in the query plan will be executed.

The various embodiments implementing the method have been described with respect to accompanying drawings. Those skilled in the art may understand that the method may be implemented in software, hardware or combinations of software and hardware. Moreover, those skilled in art may understand that by implementing various steps of the above method in software, hardware or combinations of software and hardware, there may be provided an environment in which example embodiments of the inventive subject matter may be practiced as shown.

Figure 4:
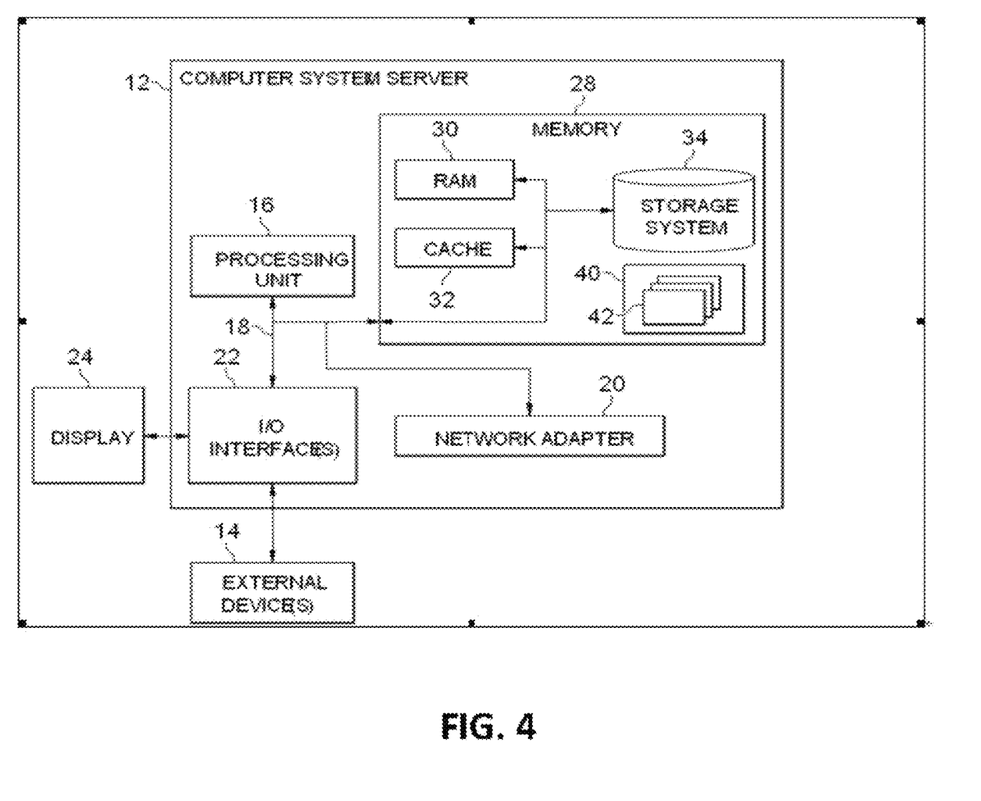
FIG. 4 illustrates a block diagram of an exemplary computer system/server 12 which is applicable to implement the embodiments.

Referring now to FIG. 4, in which a block diagram of an exemplary computer system/server 12 which implements the embodiments of the present invention is shown. Computer system/server 12 shown in FIG. 4 is only illustrative and is not intended to suggest any limitation as to the scope of use or functionality of embodiments of the invention described herein.

As shown in FIG. 4, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some preferable embodiments will be described in more detail with a reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for selective restriction of an operation, the method comprising:
   receiving, by a workload management system (WLMS), a query plan for a query, the query plan including an operation to be executed on a table in a database;
   traversing, by the WLMS, the received query plan to determine that the execution of the operation may result in a Cartesian join;
   analyzing, by the WLMS, the query plan to determine an identity of the table;
   determining, by the WLMS, that a threshold rule in the database is applicable on the identity of the table, the threshold rule defining a second operation allowed to be performed on the table; and
   based upon a determination that the threshold rule is applicable on the identity of the table, substituting, by the WLMS, the operation in the query plan with the second operation in the threshold rule.

2. The method of claim 1, wherein the analyzing of the query plan to determine the identity of the table comprises: determining the identity of the table in the database based on one or more of a group consisting of: a table name; a database schema; and a table space.

3. A computer program product for selective restriction of an operation, the computer program product comprising a computer readable storage medium having program instructions embodied therewith, the program instructions executable by a computer to cause the computer to:
   receive, by a workload management system (WLMS), a query plan for a query, the query plan including an operation to be executed on a table in a database;
   traverse, by the WLMS, the received query plan to determine that the execution of the operation may result in a Cartesian join;
   analyze, by the WLMS, the query plan to determine an identity of the table;
   determine, by the WLMS, that a threshold rule in the database is applicable on the identity of the table, the threshold rule defining a second operation allowed to be performed on the table; and
   based upon a determination that the threshold rule is applicable on the identity of the table, substitute, by the WLMS, the operation in the query plan with the second operation in the threshold rule.

4. The computer program product of claim 3, wherein in analyzing the query plan to determine the identity of the table, the computer is further caused to: determine the identity of the table in the database based on one or more of a group consisting of: a table name; a database schema; and a table space.

5. A system comprising:
one or more processors;
a computer readable storage medium having program instructions embodied therewith, the program instructions executable by the one or more processors to cause the one or more processors to:
receive, by a workload management system (WLMS), a query plan for a query, the query plan including an operation to be executed on a table in a database;
traverse, by the WLMS, the received query plan to determine that the execution of the operation may result in a Cartesian join;
analyze, by the WLMS, the query plan to determine an identity of the table;
determine, by the WLMS, that a threshold rule in the database is applicable on the identity of the table, the threshold rule defining a second operation allowed to be performed on the table; and
based upon a determination that the threshold rule is applicable on the identity of the table, substitute, by the WLMS, the operation in the query plan with the second operation in the threshold rule.

6. The system of claim 5, wherein in analyzing the query plan to determine the identity of the table, the one or more processors are further caused to: determine the identity of the table in the database based on one or more of a group consisting of: a table name; a database schema; and a table space.

7. The method of claim 1, further comprising:
based upon a determination that no threshold rule is applicable on the identity of the table, executing the operation in the query plan on the table.

8. The method of claim 1, wherein the determining that the threshold rule in the database is applicable on the identity of the table, comprises:
retrieving the threshold rule from an information section of the database, the information section further comprising configuration information for tables in the database.

9. The method of claim 1, wherein the analyzing of the query plan to determine the identity of the table and the determining that the threshold rule in the database is applicable on the identity of the table, comprise:
determining a table name of the table from the query plan;
mapping the table name from the query plan with a corresponding table name in the database; and
determining that the threshold rule in the database is applicable on the corresponding table name.

10. The method of claim 9, wherein when the table name from the query cannot be mapped to the corresponding table name in the database, determining the corresponding table name based on a table space or a database schema.

11. The computer program product of claim 3, wherein the computer is further caused to:
based upon a determination that no threshold rule is applicable on the identity of the table, execute the operation in the query plan on the table.

12. The computer program product of claim 3, wherein in determining that the threshold rule in the database is applicable on the identity of the table, the computer is further caused to:
retrieve the threshold rule from an information section of the database, the information section further comprising configuration information for tables in the database.

13. The computer program product of claim 3, wherein in analyzing the query plan to determine the identity of the table and the determining that the threshold rule in the database is applicable on the identity of the table, the computer is further caused to:
determine a table name of the table from the query plan;
map the table name from the query plan with a corresponding table name in the database; and
determine that the threshold rule in the database is applicable on the corresponding table name.

14. The computer program product of claim 13, wherein when the table name from the query cannot be mapped to the corresponding table name in the database, determine the corresponding table name based on a table space or a database schema.

15. The system of claim 5, wherein the computer is further caused to:
based upon a determination that no threshold rule is applicable on the identity of the table, execute the operation in the query plan on the table.

16. The system of claim 5, wherein in determining that the threshold rule in the database is applicable on the identity of the table, the computer is further caused to:
retrieve the threshold rule from an information section of the database, the information section further comprising configuration information for tables in the database.

17. The system of claim 5, wherein in analyzing the query plan to determine the identity of the table and the determining that the threshold rule in the database is applicable on the identity of the table, the computer is further caused to:
determine a table name of the table from the query plan;
map the table name from the query plan with a corresponding table name in the database; and
determine that the threshold rule in the database is applicable on the corresponding table name.

18. The system of claim 17, wherein when the table name from the query cannot be mapped to the corresponding table name in the database, determine the corresponding table name based on a table space or a database schema.

* * * * *